(12) United States Patent
Onodera et al.

(10) Patent No.: US 8,642,915 B2
(45) Date of Patent: Feb. 4, 2014

(54) WIRE ELECTRIC DISCHARGE MACHINING APPARATUS

(75) Inventors: Yasuo Onodera, Tokyo (JP); Takashi Yuzawa, Tokyo (JP); Kozo Nomura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 214 days.

(21) Appl. No.: 13/126,667

(22) PCT Filed: Oct. 29, 2008

(86) PCT No.: PCT/JP2008/069641
§ 371 (c)(1),
(2), (4) Date: May 16, 2011

(87) PCT Pub. No.: WO2010/050014
PCT Pub. Date: May 6, 2010

(65) Prior Publication Data
US 2011/0226742 A1  Sep. 22, 2011

(51) Int. Cl.
*B23H 7/06* (2006.01)
(52) U.S. Cl.
USPC ........................................... 219/69.12
(58) Field of Classification Search
USPC .................. 219/69.12, 69.13, 69.16; 700/162
See application file for complete search history.

(56) References Cited

U.S. PATENT DOCUMENTS

| 4,559,434 A * | 12/1985 | Kinoshita | 219/69.17 |
|---|---|---|---|
| 4,602,142 A * | 7/1986 | Itoh | 219/69.13 |
| 4,837,415 A | 6/1989 | Magara et al. | |
| 4,868,760 A * | 9/1989 | Obara | 219/69.12 |
| 5,021,622 A | 6/1991 | Magara et al. | |
| 5,418,344 A * | 5/1995 | Magara et al. | 219/69.12 |
| 5,756,954 A * | 5/1998 | Kamiguchi et al. | 219/69.12 |
| 6,774,334 B1 | 8/2004 | Kobayashi | |
| 7,262,381 B2 * | 8/2007 | Hiraga et al. | 219/69.12 |
| 2008/0251500 A1 * | 10/2008 | Hiraga et al. | 219/69.12 |

FOREIGN PATENT DOCUMENTS

| CN | 1492792 A | 4/2004 |
|---|---|---|
| JP | 1-501051 A | 4/1989 |
| JP | 02-053526 A | 2/1990 |
| JP | 07-009261 A | 1/1995 |
| JP | 2001-162446 A | 6/2001 |
| JP | 2004-148472 A | 5/2004 |
| WO | 88/03071 A1 | 5/1988 |

OTHER PUBLICATIONS

Chinese Office Action, Oct. 10, 2012.

* cited by examiner

*Primary Examiner* — Geoffrey S Evans
(74) *Attorney, Agent, or Firm* — Sughrue Mion, PLLC

(57) ABSTRACT

An object is to enable highly accurate machining by correcting machining conditions by referring to a programmed trajectory to obtain a desired machining shape. A wire electric discharge machining apparatus includes a machining-condition correcting unit that corrects machining conditions in each machining stage corresponding to a circular arc radius of a portion corresponding to a corner portion of a programmed trajectory, in the corner portion formed by changing a direction of relatively moving a wire electrode, when the wire electrode is moved on a wire center trajectory, which is offset from the programmed trajectory prestored in order to obtain a desired machining shape to perform finish machining in each machining stage with an offset amount being changed.

9 Claims, 7 Drawing Sheets

| MACHINING STAGE | CIRCULAR ARC RADIUS | CORRECTION VALUE |
|---|---|---|
| n-3 | Rc1 | k1 |
| n-2 | Rc2 | k2 |
| n-1 | Rc3 | k3 |
| n | Rc4 | k4 |

| MACHINING STAGE | CIRCULAR ARC RADIUS | CORRECTION VALUE | CIRCULAR ARC RADIUS | CORRECTION VALUE |
|---|---|---|---|---|
| n-3 | Rp1 | k1 | Rp2 | NONE (OR 1.0 TIME) |
| n-2 | Rp1 | k2 | Rp2 | NONE (OR 1.0 TIME) |
| n-1 | Rp1 | k3 | Rp2 | NONE (OR 1.0 TIME) |
| n | Rp1 | k4 | Rp2 | NONE (OR 1.0 TIME) |

WIRE ELECTRIC DISCHARGE MACHINING APPARATUS

CROSS REFERENCE TO RELATED APPLICATIONS

This application is a National Stage of International Application No. PCT/JP2008/069641 filed Oct. 29, 2008, the content of which is incorporated herein by reference in its entirety.

TECHNICAL FIELD

The present invention relates to a wire electric discharge machining apparatus.

BACKGROUND ART

A wire electric discharge machining apparatus is an apparatus in which a wire electrode is placed opposite to a workpiece, pulsed discharge is generated in a machining gap between the wire electrode and the workpiece, to machine the workpiece into a desired shape by using a thermal energy. Normally, in wire electric discharge machining, crude machining is performed first, and then finish machining is performed for a plurality of times to improve shape precision.

In a corner portion of a machining shape, machining accuracy tends to decrease as compared with a linear portion, which is formed by relatively moving a wire electrode in a linear direction. The corner portion is formed by changing a direction of relative move of the wire electrode, and is machined by relatively moving the wire electrode along a circular arc trajectory. For example, in a case of in-corner machining in which a wire electrode is moved inside of a corner portion, because a machining amount increases between a previous machining surface and a current machining surface, as compared with machining of a linear portion, left over easily occurs in the corner portion. Further, in a case of out-corner machining in which a wire electrode is moved outside a corner portion, because a machining amount decreases as compared with machining of a linear portion, excessive machining in the corner portion easily occurs.

To improve reduction of machining accuracy, control is required such that a machining amount in a corner portion is made equal to that in a linear portion. For example, Patent Document 1 proposes a technique of controlling a machining speed at the time of machining a corner portion according to an increase and a decrease of a machining removal distance (a machining allowance), for improving its machining accuracy. The machining removal distance is a length of a normal drawn from a point at an intersection of a discharge gap circle (a circle with a radius having a length obtained by adding a discharge gap to a radius of a sectional surface of the wire electrode) with the previous machining surface to the current machining surface, and is approximated to the machining amount described above. Further, Patent Document 2 proposes a technique of determining machining conditions by using a function, which uses a variable for a circular arc radius of a wire center trajectory for relatively moving a wire electrode, in order to suppress a shear drop (deviation) of a machining shape as well as a left over amount in a predetermined range.

Patent Document 1: Japanese Patent Application Laid-open No. 2004-148472
Patent Document 2: Japanese Patent Application Laid-open No. 2001-162446

DISCLOSURE OF INVENTION

Problem to be Solved by the Invention

When a workpiece has a large board thickness or when a machining fluid nozzle for injecting a machining fluid is placed at a position away from a workpiece, a deflection or runout may occur in a wire electrode. When there is a deflection or runout in the wire electrode, a geometrically calculated machining removal distance may differ from an actual machining removal distance. Therefore, in the technique disclosed in Patent Document 1, even if a machining speed is controlled according to the calculated machining removal distance, improvement of its machining accuracy may be difficult.

In the case of the technique in Patent Document 2, even if there is a deflection or runout in a wire electrode, its machining accuracy can be improved by correcting machining conditions according to a circular arc radius of a wire center trajectory. The circular arc radius of the wire center trajectory changes according to an offset amount from a programmed trajectory prestored in order to obtain a desired machining shape. Therefore, even when an intended final machining shape has a different circular arc radius from each other, the wire center trajectory may become the same circular arc radius in some machining stages of finish machining. When the machining conditions are corrected by specifying the circular arc radius of the wire center trajectory, even if the final machining shape has a circular arc radius different from each other, the machining conditions are corrected for each corner portion, if there is a machining stage in which the wire center trajectory has the specified circular arc radius. Therefore, in the case of the technique disclosed in Patent Document 2, when a plurality of corner portions having a different circular arc radius are to be machined, appropriate correction can be performed for a corner portion that requires correction. However, because the machining conditions of a corner portion that does not require any correction are also corrected, its machining accuracy may decrease as a whole.

The present invention has been achieved to solve the above problems, and an object of the present invention is to provide a wire electric discharge machining apparatus that can perform machining highly accurately, by correcting machining conditions by referring to a programmed trajectory in order to obtain a desired machining shape.

Means for Solving Problem

In order to solve the aforementioned problems and attain the aforementioned objects, a wire electric discharge machining apparatus according to one aspect of the present invention is constructed in such a manner as to generate discharge between a wire electrode and a workpiece and moves the wire electrode and the workpiece relative to each other to perform discharge machining with respect to the workpiece, and as to include: a corner speed controller that controls a machining speed for each wire center trajectory in a corner portion, according to an amount of machining estimated for the corner portion formed by changing a direction of relatively moving the wire electrode, when the wire electrode is moved on the wire center trajectory, which is offset from a programmed trajectory prestored to obtain a desired machining shape, to perform finish machining in each of machining stages with an offset amount being changed; and a machining-condition correcting unit that corrects machining conditions in each of the machining stages corresponding to a circular arc radius of a portion corresponding to the corner portion of the programmed trajectory, with respect to machining according to the machining speed calculated by the corner speed controller.

Effect of the Invention

According to the present invention, because correction of machining conditions in each machining stage is performed by referring to a programmed trajectory, machining conditions can be corrected with respect only to a corner portion that requires correction, without affecting machining of a corner portion that does not require any correction. Accordingly, an effect that high machining accuracy can be obtained particularly for a machining shape having a corner portion is demonstrated.

EXPLANATIONS OF LETTERS OR NUMERALS

Figure 1:
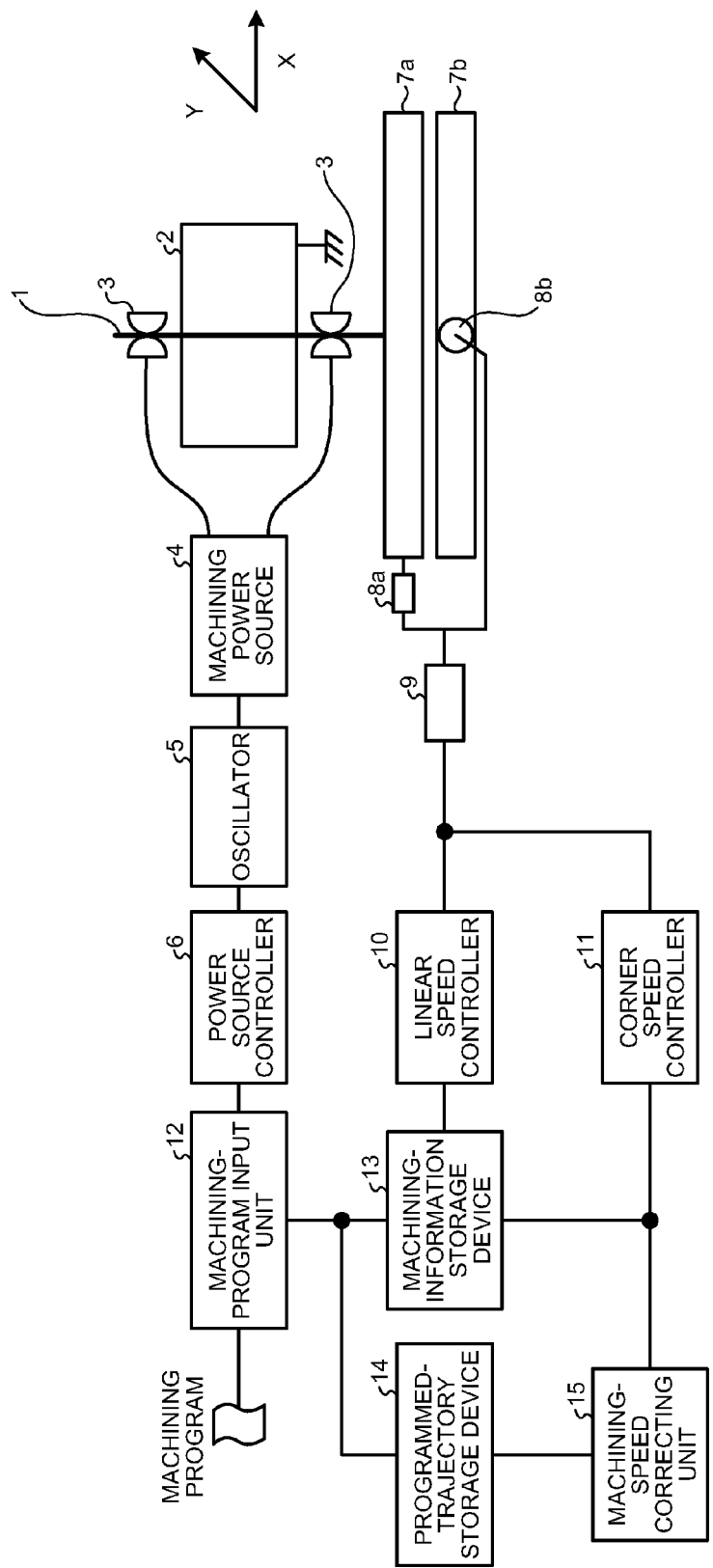
FIG. 1 is a schematic configuration diagram of a wire electric discharge machining apparatus according to a first embodiment.

1 Wire electrode
2 Workpiece
6 Power source controller
11 Corner speed controller
14 Programmed-trajectory storage device
15 Machining-speed correcting unit
21 Downtime correcting unit
31 Offset correcting unit

BEST MODE(S) FOR CARRYING OUT THE INVENTION

Exemplary embodiments of a wire electric discharge machining apparatus according to the present invention will be explained below in detail with reference to the accompanying drawings.

First Embodiment

FIG. 1 is a schematic configuration diagram of a wire electric discharge machining apparatus according to a first embodiment of the present invention. The wire electric discharge machining apparatus according to the present embodiment is a penetration-type wire electric discharge machining apparatus that machines a workpiece 2 into a desired shape by using a wire electrode 1 in a machining tank filled with machining fluid. The wire electric discharge machining apparatus according to the present embodiment can be appropriately changed based on an outline explained below by persons skilled in the art. Therefore, explanations of the present embodiment should be understood widely as contents disclosed relating to the corresponding technical field, and do not limit the present invention.

The wire electrode 1 is guided by wire guides appropriately arranged vertically at an interval, and moves downward, for example. The workpieces 2 having a certain board thickness are arranged at a predetermined processing distance in a moving path of the wire electrode 1 between the wire guides, facing the wire electrode 1. A plane on which the workpiece 2 is arranged is referred to as an XY plane. For example, the XY plane is a plane orthogonal to a traveling direction of the wire electrode 1. An X-axis and a Y-axis are set to be orthogonal to each other.

Machining fluid nozzles are respectively provided in the moving path of the wire electrode 1 between the wire guides at a position vertically adjacent to each other, sandwiching a position facing the workpiece 2 therebetween. The machining fluid nozzles inject a machining fluid at high pressure into a machining gap respectively from above and below, to perform cooling and removal of discharge machining debris. A power feed contact 3 is provided in contact with the wire electrode 1 near the upper wire guide of the wire electrode 1 and near the lower wire guide of the wire electrode 1. The power feed contact 3 supplies power to the wire electrode 1.

A machining power source 4 supplies a current pulse for generating pulsed discharge in the machining gap. An oscillator 5 outputs a clock signal, which is a reference clock of the current pulse supplied by the machining power source 4. A power source controller 6 controls a switching operation of the machining power source 4. A Y table 7a moves the workpiece 2 in the direction of a Y-axis. An X table 7b moves the workpiece 2 in the direction of an X-axis. A Y-table drive unit 8a drives the Y table 7a. An X-table drive unit 8b drives the X table 7b. A servo amplifier 9 operates the Y-table drive unit 8a and the X-table drive unit 8b according to the control of a linear speed controller 10 and a corner speed controller 11.

A machining program for wire discharge machining is input to a machining-program input unit 12. A machining-information storage device 13 stores information required for control of a machining speed of a linear portion and a corner portion, out of the machining program input from the machining-program input unit 12. A programmed-trajectory storage device 14 stores a programmed trajectory for obtaining a desired final machining shape. The linear speed controller 10 controls the machining speed at the time of machining the linear portion. The corner speed controller 11 controls the machining speed at the time of machining the corner portion. A machining-speed correcting unit 15 corrects the machining speed at the time of machining the corner portion.

Figure 2:
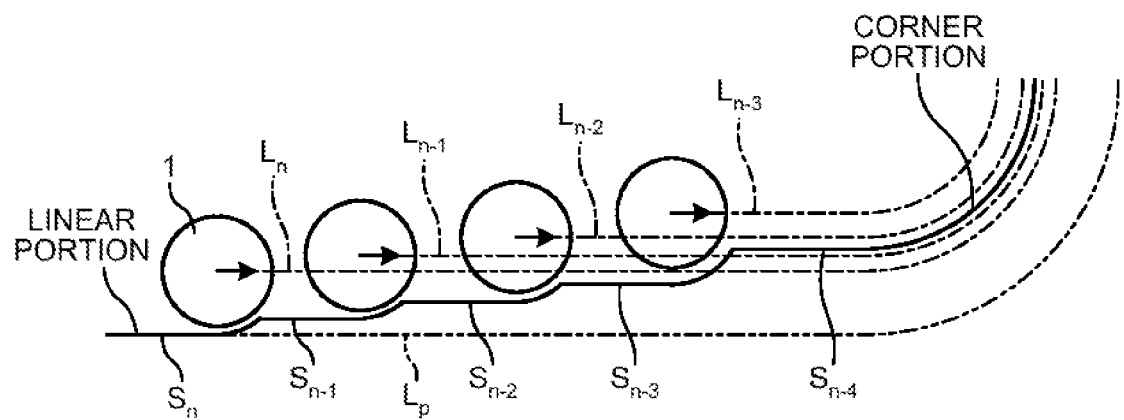
FIG. 2 is an explanatory diagram of finish machining of a corner portion.

A principle for improving the machining accuracy according to the present invention is explained before explaining the operation of the wire electric discharge machining apparatus according to the present embodiment. FIG. 2 is an explanatory diagram of finish machining of the corner portion. Normally, in the wire electric discharge machining, rough machining is performed first, and then, finish machining is performed more than once to improve machining surface roughness or shape precision. An example in which n-stage finish machining is performed is explained. The wire electrode 1 in X-Y cross section and a machining surface of the workpiece 2 in a state in which machining has been performed are shown in FIG. 2.

An n-3 stage machining surface $S_{n-3}$ is formed by performing n-3 stage machining with respect to an n-4 stage machining surface $S_{n-4}$. An n-2 stage machining surface $S_{n-2}$ is formed by performing n-2 stage machining with respect to the n-3 stage machining surface $S_{n-3}$. An n-1 stage machining surface $S_{n-1}$ is formed by performing n-1 stage machining with respect to the n-2 stage machining surface $S_{n-2}$. An n-stage machining surface $S_n$ is formed by performing n-stage machining with respect to the n-1 stage machining surface $S_{n-1}$. A programmed trajectory $L_p$ is a trajectory which represents an intended final machining shape. The n-stage machining surface $S_n$ is a surface formed in the final machining shape and is formed so as to match the programmed trajectory $L_p$ within the X-Y plane shown in the drawings.

In the n-stage machining, an n-stage wire center trajectory $L_n$ for moving the wire electrode 1 is offset so as to be away from the programmed trajectory $L_p$ by a distance obtained by adding a discharge gap at the time of n-stage machining to a radius of cross section of the wire electrode 1. In the n-1 stage machining, an n-1 stage wire center trajectory $L_{n-1}$ for moving the wire electrode 1 is offset so as to be away from the n-1 stage machining surface $S_{n-1}$ by a distance obtained by adding a discharge gap at the time of n-stage machining to the radius of cross section of the wire electrode 1. Similarly, an n-2 stage wire center trajectory $L_{n-2}$ and an n-3 stage wire center trajectory $L_{n-3}$ are offset so as to be away from the current stage machining surface by a distance obtained by adding a discharge gap in the current machining stage to the radius of cross section of the wire electrode 1. In this manner, in the finish machining of the corner portion, an offset amount of the wire center trajectory is changed in each machining stage.

A circular arc radius in the corner portion is different for the programmed trajectory $L_p$ and the wire center trajectory in each stage. While the circular arc radius of the programmed trajectory $L_p$ is uniquely set with respect to the final machining shape of the corner portion, the circular arc radius of the wire center trajectory varies according to the offset amount, and is not uniquely set with respect to the final machining shape of the corner portion.

Figure 3:
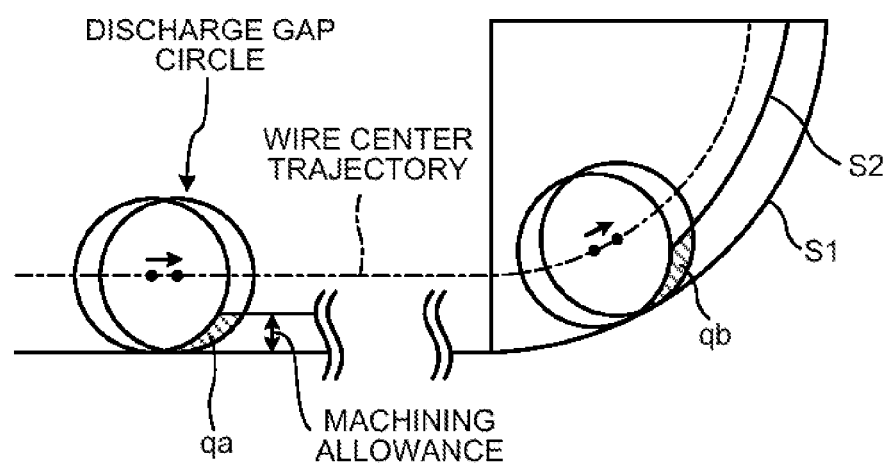
FIG. 3 is an explanatory diagram of in-corner machining.

FIG. 3 is an explanatory diagram of in-corner machining in which the wire electrode 1 is moved inside of the corner portion. A circle having a radius equal to a length obtained by adding a discharge gap to the radius of cross section of the wire electrode 1 is referred to as a discharge gap circle. When a machining amount in a machining allowance between the previous machining surface S2 and the current machining surface S1 when the discharge gap circle is moved for a predetermined distance is compared, in the case of in-corner machining, a machining amount qb of the corner portion at the time of machining the corner portion increases as compared with a machining amount qa of the linear portion at the time of machining the linear portion. Accordingly, assuming that the machining speed is constant in the linear portion and the corner portion, left over occurs in the corner portion with respect to the linear portion. Therefore, the machining accuracy in the corner portion is improved by appropriately estimating the machining amount qb of the corner portion and decreasing the machining speed appropriately according to an increase in the machining amount qb of the corner portion with respect to the machining amount qa of the linear portion.

Figure 4:
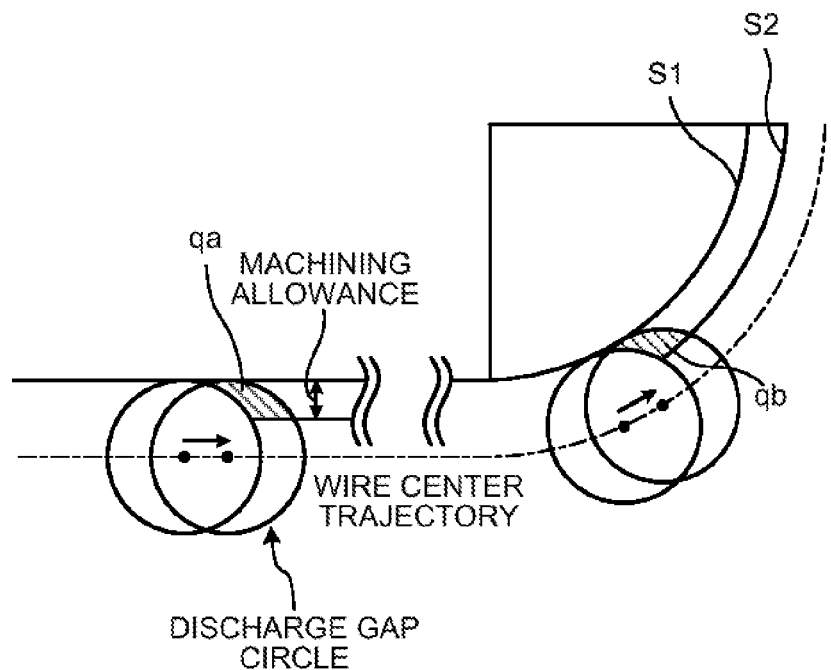
FIG. 4 is an explanatory diagram of out-corner machining.

FIG. 4 is an explanatory diagram of out-corner machining in which the wire electrode 1 is moved outside of the corner portion. When a machining amount in the machining allowance between the previous machining surface S2 and the current machining surface S1 when the discharge gap circle is moved for a predetermined distance is compared, in the case of out-corner machining, the machining amount qb of the corner portion at the time of machining the corner portion decreases as compared with the machining amount qa of the linear portion at the time of machining the linear portion. Accordingly, assuming that the machining speed is constant in the linear portion and the corner portion, excessive machining occurs in the corner portion with respect to the linear portion. Therefore, the machining accuracy in the corner portion is improved by appropriately estimating the machining amount qb of the corner portion and increasing the machining speed appropriately according to a decrease in the machining amount qb of the corner portion with respect to the machining amount qa of the linear portion.

When the workpiece 2 has a large board thickness or when the machining fluid nozzle is placed at a position away from the workpiece 2, a deflection or runout may occur in the wire electrode 1. When there is a deflection or runout in the wire electrode 1, there is a difference between the estimated machining amount and the actual machining amount, and even if the machining speed is controlled according to the estimated machining amount, a shape error may occur. Therefore, improvement of the machining accuracy may be difficult, even if the machining speed is controlled according to the estimated machining amount. The wire electric discharge machining apparatus according to the present embodiment improves the machining accuracy by correcting machining conditions in each machining stage.

Figure 5:
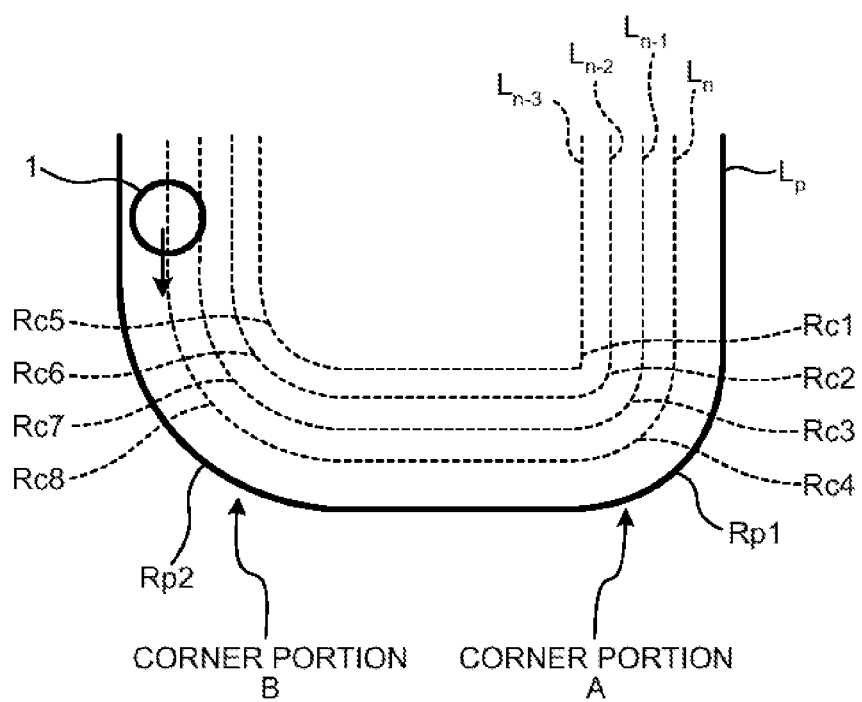
FIG. 5 is a diagram of a programmed trajectory and a wire center trajectory when corner portions having a circular arc radius different from each other are machined.

A problem in a conventional case in which the machining conditions are corrected according to the wire center trajectory and an advantage in the present invention in which the machining conditions are corrected according to the programmed trajectory are explained. FIG. 5 represents a programmed trajectory and a wire center trajectory when corner portions having a circular arc radius different from each other are machined. An example in which as a result of trial machining of a shape having corner portions A and B having a circular arc radius different from each other, one corner portion A has a shape error, and another corner portion B does not have a shape error is explained. It is assumed that the corner portions A and B are continuously machined in each machining stage.

It is assumed that the corner portions A and B are finished in a shape matching the programmed trajectory $L_p$ by performing finish machining with respect to the inside of the corner shape. A circular arc radius Rp1 of the programmed trajectory $L_p$ in the corner portion A is different from a circular arc radius Rp2 of the programmed trajectory $L_p$ in the corner portion B. It is assumed here that the radii of circular arc of wire center trajectories $L_{n-3}$, $L_{n-2}$, $L_{n-1}$, and $L_n$ in the corner portion A are Rc1, Rc2, Rc3, and Rc4 in order from the inside of the corner portion A, and the radii of circular arc of wire center trajectories $L_{n-3}$, $L_{n-2}$, $L_{n-1}$, and $L_n$, in the corner portion B are Rc5, Rc6, Rc7, and Rc8 in order from the inside of the corner portion B.

Figures 6, 7:
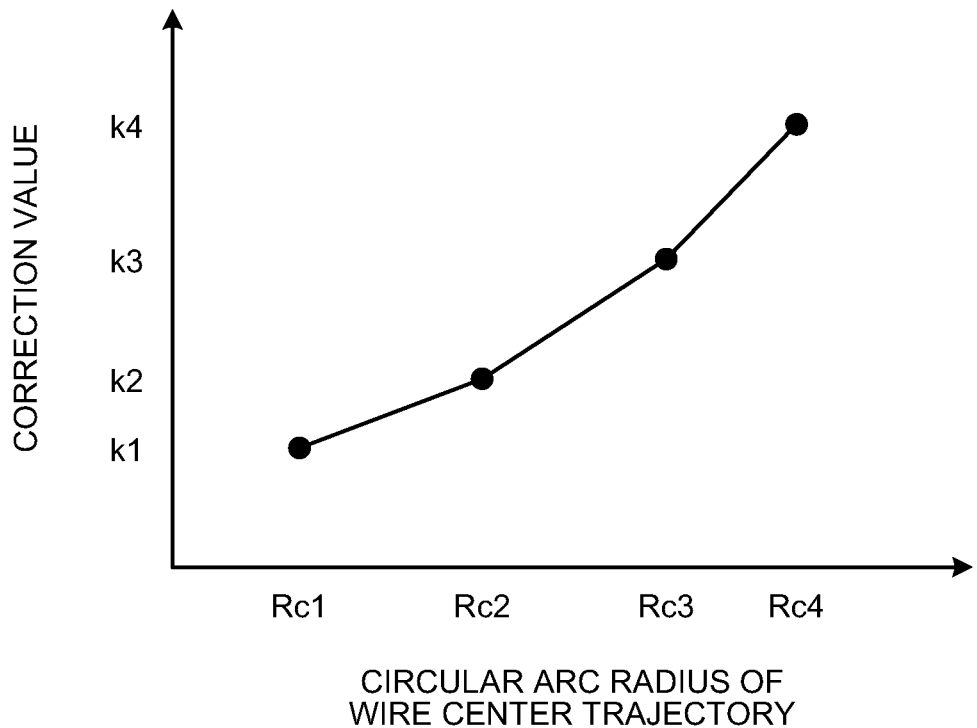
FIG. 6 is a graph of an example of calculated correction values when machining conditions are corrected according to a wire center trajectory.
FIG. 7 is a table referred to at the time of correcting machining conditions according to the correction values explained in FIG. 6.

FIG. 6 is a graph of an example of calculated correction values when the machining conditions are corrected according to the wire center trajectory. FIG. 7 is a table referred to at the time of correcting the machining conditions according to the correction values explained in FIG. 6. In this example, to improve the shape error of the corner portion A, correction values k1, k2, k3, and k4 to be multiplied by the machining speed are respectively set with respect to the radii of circular arc Rc1, Rc2, Rc3, and Rc4 of the wire center trajectories $L_{n-3}$, $L_{n-2}$, $L_{n-1}$, and $L_n$.

When the corner portions A and B are continuously machined, if any one of the radii of circular arc Rc5, Rc6, Rc7, and Rc8 in the corner portion B matches any one of the radii of circular arc Rc1, Rc2, Rc3, and Rc4 in the corner portion A, the machining conditions are corrected for the corner portion B as well. For example, when the circular arc radius Rc4 of the wire center trajectory $L_n$ in the corner portion A matches the circular arc radius Rc5 of the wire center trajectory $L_{n-3}$ in the corner portion B, the correction value k4 in the wire center trajectory $L_n$ of the corner portion A is applied to the machining speed in the wire center trajectory $L_{n-3}$ of the corner portion B.

In this manner, when the machining conditions are to be corrected according to the wire center trajectory, and when a plurality of corner portions having a different circular arc radius are machined, appropriate correction is possible for the corner portion requiring correction. On the other hand, the machining conditions of the corner portion that does not require any correction are also corrected, thereby causing a problem such that its machining accuracy decreases as a whole.

Figures 8, 9:
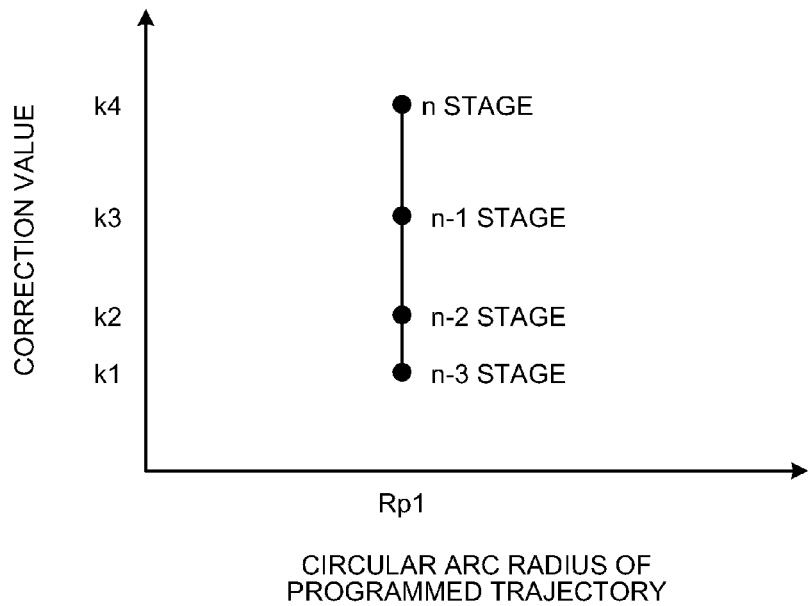
FIG. 8 is a graph of an example of calculated correction values when machining conditions are corrected according to a programmed trajectory.
FIG. 9 is a table referred to at the time of correcting machining conditions according to the correction values explained in FIG. 8.

FIG. 8 is a graph of an example of calculated correction values when the machining conditions are corrected according to the programmed trajectory in the present invention. FIG. 9 is a table referred to at the time of correcting the machining conditions according to the correction values explained in FIG. 8. In this example, to improve the shape error of the corner portion A, correction values k1, k2, k3, and k4 to be multiplied by each machining speed in the n-3 stage, n-2 stage, n-1 stage, and n stage are respectively set with respect to the circular arc radius Rp1 of the programmed trajectory $L_p$. For the corner portion B, it is set such that there is no correction of the machining conditions in the n-3 stage, n-2 stage, n-1 stage, and n stage for the circular arc radius Rp2 of the programmed trajectory $L_p$, or a correction value 1.0 to be multiplied by each machining speed is set.

The circular arc radius Rp1 of the programmed trajectory $L_p$ in the corner portion A and the circular arc radius Rp2 of the programmed trajectory $L_p$ in the corner portion B are different from each other (Rp1≠Rp2). The correction value set for the circular arc radius Rp1 is applied to machining of the corner portion A, and is not applied to machining of the corner portion B having the circular arc radius Rp2. Therefore, it does not affect the machining of the corner portion B that does not require any correction, and the machining conditions can be corrected only for the corner portion A having the specific circular arc radius Rp1.

An operation of the wire electric discharge machining apparatus according to the present embodiment is explained next with reference to FIG. 1. The machining program is preliminarily input from the machining-program input unit 12 before the start of machining. The power source controller 6 controls the oscillator 5 and the machining power source 4 according to the machining program input from the machining-program input unit 12. The machining power source 4 applies a pulse voltage to the machining gap between the wire electrode 1 and the workpiece 2 via the power feed contact 3, according to a clock signal from the oscillator 5. For example, a wire-electrode traveling device is used for traveling of the wire electrode 1.

The machining-information storage device 13 stores information required for controlling the machining speed, of the machining program input from the machining-program input unit 12. The programmed-trajectory storage device 14 stores the programmed trajectory indicating the final machining shape, of the machining program input from the machining-program input unit 12.

The linear speed controller 10 refers to the information required for controlling the machining speed in the linear portion in the machining-information storage device 13, and outputs a signal indicating the machining speed in the linear portion. The corner speed controller 11 refers to the information required for controlling the machining speed in the corner portion in the machining-information storage device 13. The corner speed controller 11 geometrically calculates a machining amount of the corner portion explained in FIGS. 3 and 4, and outputs a signal indicating the machining speed appropriately increased or decreased according to the machining amount of the corner portion.

For example, when there is a deflection or runout in the wire electrode 1, even if control is performed to obtain a theoretically calculated machining speed, a shape error may occur in the corner portion. Such a shape error may change in size according to the circular arc radius of the programmed trajectory. When the machining accuracy cannot be completely improved by the machining speed calculated by the corner speed controller 11, the machining speed is corrected by using the correction value stored in the machining-speed correcting unit 15.

The machining-speed correcting unit 15 obtains and stores a correction value of a machining speed in each machining stage beforehand corresponding to the circular arc radius of the programmed trajectory. The machining-speed correcting unit 15 refers to the programmed trajectory stored in the programmed-trajectory storage device 14, to obtain information indicating the current machining stage from the machining program input to the machining-program input unit 12. The machining-speed correcting unit 15 outputs a correction value corresponding to a referred circular arc radius of the programmed trajectory and the current machining stage to the corner speed controller 11. The corner speed controller 11 outputs a signal indicating the machining speed obtained by multiplying the machining speed calculated beforehand by the correction value from the machining-speed correcting unit 15. Thus, the machining-speed correcting unit 15 functions as a machining-condition correcting unit that corrects the machining speed, which is a machining condition in each machining stage, according to the circular arc radius of a part corresponding to the corner portion of the programmed trajectory.

At the time of machining of the linear portion, the servo amplifier 9 operates the Y-table drive unit 8a and the X-table drive unit 8b according to a machining speed command from the linear speed controller 10. At the time of machining of the corner portion, the servo amplifier 9 operates the Y-table drive unit 8a and the X-table drive unit 8b according to a machining speed command from the corner speed controller 11 and the wire center trajectory. By moving the Y table 7a by driving the Y-table drive unit 8a and the X table 7b by driving the X-table drive unit 8b, respectively, the wire electrode 1 and the workpiece 2 are moved relative to each other.

The wire electric discharge machining apparatus according to the present embodiment can correct the machining conditions with respect only to a corner portion having a specific circular arc radius, without affecting machining of a corner portion that does not require any correction, by referring to the programmed trajectory to correct the machining conditions in each machining stage. Accordingly, high machining accuracy can be obtained particularly for a machining shape including a corner portion.

Second Embodiment

Figure 10:
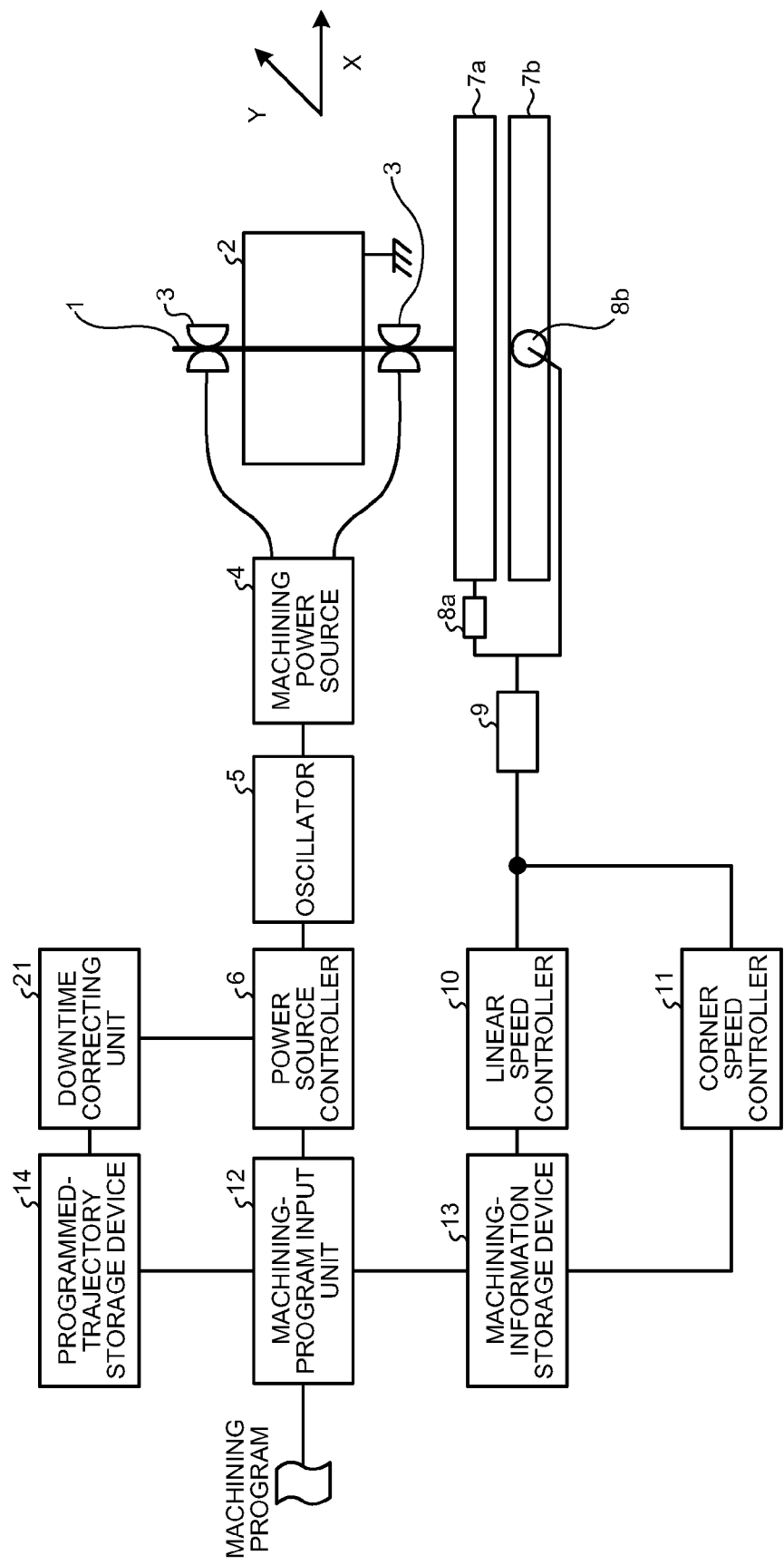
FIG. 10 is a schematic configuration diagram of a wire electric discharge machining apparatus according to a second embodiment.

FIG. 10 is a schematic configuration diagram of a wire electric discharge machining apparatus according to a second embodiment of the present invention. The wire electric discharge machining apparatus according to the present embodiment is characterized by including a downtime correcting unit 21 that corrects discharge downtime, during which discharge is suspended. Parts identical to those in the first embodiment described above are denoted by like reference numerals and redundant explanations thereof will be omitted. The downtime correcting unit 21 functions as a machining-condition correcting unit that corrects discharge downtime, which is a machining condition in each machining stage, according to the circular arc radius of a portion corresponding to the corner portion of the programmed trajectory.

When the machining accuracy cannot be completely improved by the machining speed calculated by the corner speed controller 11, the discharge downtime in the corner portion is corrected by using the correction value stored in the downtime correcting unit 21. The downtime correcting unit 21 obtains a correction value of the discharge downtime in each machining stage corresponding to the circular arc radius of the programmed trajectory beforehand and stores the correction value therein.

The downtime correcting unit 21 obtains information indicating the current machining stage from a machining program input to the machining-program input unit 12, by referring to the programmed trajectory stored in the programmed-trajectory storage device 14. The downtime correcting unit 21 outputs a correction value corresponding to the referred circular arc radius of the programmed trajectory and the current machining stage to the power source controller 6. The power source controller 6 outputs a signal indicating the downtime obtained by multiplying the preset downtime by the correction value from the downtime correcting unit 21. The oscillator 5 outputs a clock signal with the downtime being adjusted, according to a command from the power source controller 6. In this manner, the discharge downtime between the wire electrode 1 and the workpiece 2 is adjusted. Also in the present embodiment, machining conditions can be corrected with respect only to the corner portion requiring correction, thereby enabling to obtain high machining accuracy without affecting machining of the corner portion that does not require any correction.

Third Embodiment

Figure 11:
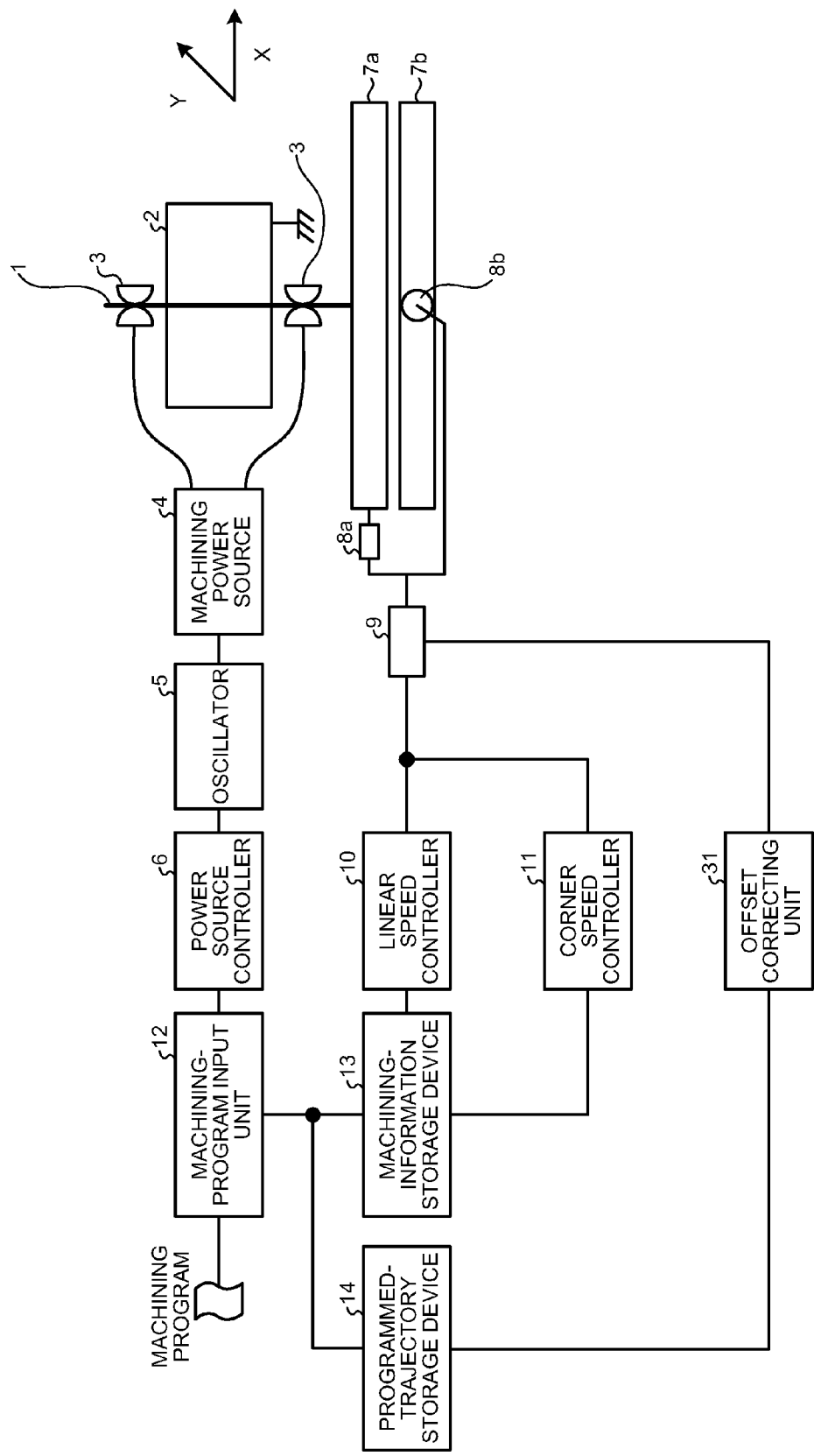
FIG. 11 is a schematic configuration diagram of a wire electric discharge machining apparatus according to a third embodiment.

FIG. 11 is a schematic configuration diagram of a wire electric discharge machining apparatus according to a third embodiment of the present invention. The wire electric discharge machining apparatus according to the present embodiment is characterized by including an offset correcting unit 31 that corrects an offset amount of the wire center trajectory from the programmed trajectory. Parts identical to those in the first embodiment described above are denoted by like reference numerals and redundant explanations thereof will be omitted. The offset correcting unit 31 functions as a machining-condition correcting unit that corrects the offset amount, which is a machining condition in each machining stage, according to the circular arc radius of a portion corresponding to the corner portion of the programmed trajectory.

When the machining accuracy cannot be completely improved by the machining speed calculated by the corner speed controller 11, the offset amount in the corner portion is corrected by using the correction value stored in the offset correcting unit 31. The offset correcting unit 31 obtains a correction value of the offset amount in each machining stage corresponding to the circular arc radius of the programmed trajectory beforehand and stores the correction value therein.

The offset correcting unit 31 obtains information indicating the current machining stage from the machining program input to the machining-program input unit 12, by referring to the programmed trajectory stored in the programmed-trajectory storage device 14. The offset correcting unit 31 outputs a correction value corresponding to the referred circular arc radius of the programmed trajectory and the current machining stage to the servo amplifier 9. At the time of machining of the corner portion, the servo amplifier 9 operates the Y-table drive unit 8a and the X-table drive unit 8b according to a machining speed command from the corner speed controller 11 and the wire center trajectory with the offset amount being corrected. Also in the present embodiment, machining conditions can be corrected with respect only to the corner portion requiring correction, thereby enabling to obtain high machining accuracy without affecting machining of the corner portion that does not require any correction.

INDUSTRIAL APPLICABILITY

As described above, the wire electric discharge machining apparatus according to the present invention is useful for machining a shape having a corner portion.

The invention claimed is:

1. A wire electric discharge machining apparatus that generates electric discharges between a wire electrode and a workpiece and moves the wire electrode and the workpiece relative to each other, to perform discharge machining on the workpiece, the apparatus comprising:
    a corner speed controller configured to calculate and control a machining speed for each wire center trajectory in a corner portion according to an amount of machining estimated for the corner portion, wherein the wire electrode is moved on the wire center trajectory which is offset from a programmed trajectory with a different offset amount during each of machining stages; and
    a machining-condition correcting unit configured to correct machining conditions in each of the machining stages based on a circular arc radius of the programmed trajectory, with respect to machining according to the machining speed calculated by the corner speed controller,
    wherein the machining stages correspond to machining passes performed in finish machining of the workpiece, and
    the programmed trajectory is a desired projected machining shape to be obtained after a final machining pass of the corner portion is completed.

2. The wire electric discharge machining apparatus according to claim 1, wherein the corner portion is formed by changing a movement direction of the wire electrode.

3. The wire electric discharge machining apparatus according to claim 1, further comprising:
    a storage which stores correction values for each respective machining stage in correspondence to the circular arc radius of the programmed trajectory,
    wherein the machining-condition correcting unit is configured to calculate a corrected machining speed at a time of machining the corner portion for each respective machining stage as a product of the correction value and the machining speed calculated by the corner speed controller, for the respective machining stage.

4. The wire electric discharge machining apparatus according to claim 1, wherein the machining-condition correcting unit is a downtime correcting unit that corrects discharge downtime, during which discharge in the corner portion is suspended.

5. The wire electric discharge machining apparatus according to claim 4, wherein the downtime correcting unit stores a correction value of the discharge downtime in each of the machining stages corresponding to the circular arc radius of the programmed trajectory, and outputs the correction value corresponding to a referred circular arc radius of the programmed trajectory and a current machining stage.

6. The wire electric discharge machining apparatus according to claim 1, wherein the machining-condition correcting unit is an offset correcting unit that corrects the offset amount.

7. The wire electric discharge machining apparatus according to claim 6, wherein the offset correcting unit stores a correction value of the offset amount in each of the machining stages corresponding to the circular arc radius of the programmed trajectory, and outputs the correction value corresponding to a referred circular arc radius of the programmed trajectory and a current machining stage.

8. The wire electric discharge machining apparatus according to claim 1, wherein the machining-condition correcting unit is a machining-speed correcting unit that corrects a machining speed at a time of machining the corner portion.

9. The wire electric discharge machining apparatus according to claim 8, wherein the machining-speed correcting unit stores a correction value of the machining speed in each of the machining stages corresponding to the circular arc radius of the programmed trajectory, and outputs the correction value corresponding to a referred circular arc radius of the programmed trajectory and a current machining stage.

\* \* \* \* \*